United States Patent
Vogan et al.

(10) Patent No.: US 9,690,953 B2
(45) Date of Patent: Jun. 27, 2017

(54) GENERATING EFFICIENT READS FOR A SYSTEM HAVING NON-VOLATILE MEMORY

(71) Applicant: Apple Inc., Cupertino, CA (US)

(72) Inventors: Andrew W. Vogan, Portland, OR (US); Matthew J. Byom, Campbell, CA (US); Alexander C. Sanks, Menlo Park, CA (US); Daniel J. Post, Campbell, CA (US); Hari Hara Kumar Maharaj, Sunnyvale, CA (US); Nir Jacob Wakrat, Los Altos, CA (US); Kenneth L. Herman, San Jose, CA (US)

(73) Assignee: APPLE INC., Cupertino, CA (US)

( * ) Notice: Subject to any disclaimer, the term of this patent is extended or adjusted under 35 U.S.C. 154(b) by 201 days.

(21) Appl. No.: 14/212,049

(22) Filed: Mar. 14, 2014

(65) Prior Publication Data

US 2014/0281588 A1    Sep. 18, 2014

Related U.S. Application Data

(60) Provisional application No. 61/783,249, filed on Mar. 14, 2013.

(51) Int. Cl.
*G06F 21/00* (2013.01)
*G06F 21/79* (2013.01)

(52) U.S. Cl.
CPC ...... *G06F 21/79* (2013.01); *G06F 2221/2107* (2013.01)

(58) Field of Classification Search
CPC . H04L 9/0822; G06F 21/79; G06F 2221/2107
See application file for complete search history.

(56) References Cited

U.S. PATENT DOCUMENTS

| | | | | |
|---|---|---|---|---|
| 8,935,465 B1* | 1/2015 | Shaharabany | ...... | G06F 12/0246 711/103 |
| 2008/0307270 A1* | 12/2008 | Li | ................................... | 714/47 |
| 2009/0165020 A1* | 6/2009 | Allen et al. | ................... | 719/314 |
| 2010/0287446 A1* | 11/2010 | Post et al. | ...................... | 714/763 |
| 2011/0213921 A1* | 9/2011 | Yu et al. | ........................ | 711/103 |
| 2013/0198464 A1* | 8/2013 | Sharma | .................. | G06F 12/06 711/157 |

* cited by examiner

*Primary Examiner* — Mahfuzur Rahman
*Assistant Examiner* — Narciso Victoria
(74) *Attorney, Agent, or Firm* — Van Court & Aldridge LLP

(57) ABSTRACT

Systems and methods are disclosed for generating efficient reads for a system having non-volatile memory ("NVM"). A read command can be separated by a host processor of the system into two phases: a) transmitting a command to a storage processor of the system, where the command is associated with one or more logical addresses, and b) generating data transfer information. The host processor can generate the data transfer information while the storage processor is processing the command from the host processor. Once the data transfer information has been generated and data has been read from the NVM, the data can be transferred.

16 Claims, 8 Drawing Sheets

GENERATING EFFICIENT READS FOR A SYSTEM HAVING NON-VOLATILE MEMORY

CROSS-REFERENCE TO RELATED APPLICATIONS

This application claims the benefit of U.S. Provisional Patent Application No. 61/783,249 filed Mar. 14, 2013, which is incorporated by reference herein its entirety.

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

Read commands can be issued by an application or an operating system to obtain data from an NVM. Generally, these read commands are not transmitted to the NVM until a processor of the system has an opportunity to setup the command. For example, the processor can setup encryption/decryption information and direct memory access ("DMA") information. Thus, the time that it takes for the decryption information to be generated can increase the overall read latency.

SUMMARY OF THE DISCLOSURE

Systems and methods are disclosed for generating efficient reads for a system having non-volatile memory ("NVM"). In particular, a read command can be separated by a host processor of the system into two phases: a) transmitting a command to a storage processor of the system, where the command is associated with one or more logical addresses, and b) generating data transfer information. As used herein, "data transfer information" can include physical buffer location information and decryption information associated with data read from an NVM.

By parallelizing large portions of command setup with command execution, the host processor can generate the data transfer information while the storage processor is processing the command from the host processor. This parallelism can reduce command latency (e.g., read access time), particularly for small requests. Once the data transfer information has been generated and data has been read from the NVM, the data can be transferred.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for generating efficient reads for a system having non-volatile memory ("NVM") are provided. In particular, a read command can be separated by a host processor of the system into two phases: a) transmitting a command to a storage processor of the system, where the command is associated with one or more logical addresses, and b) generating data transfer information. As used herein, "data transfer information" can include physical buffer location information and decryption information associated with data read from the NVM.

The host processor can generate the data transfer information while the storage processor is processing the command from the host processor. This parallelism can reduce read access time, particularly for small requests. Once the data transfer information has been generated and data has been read from the NVM, the data can be transferred.

There can be several approaches for determining when data transfer information has been generated and when data transfer can begin. In some embodiments, the host processor can send a second command to the storage processor once data transfer information has been generated for all logical addresses.

In other embodiments, the host processor can maintain a counter that indicates the most recent logical address for which data transfer information has been generated. The counter can be shared with the storage processor such that the storage processor can determine, based on a current counter value, whether data transfer information has been generated for one or more logical addresses.

In further embodiments, the host processor can first write a default token value to each entry of an array, where the array can be used to store data transfer information. The storage processor can then monitor the array and detect when the default token value has been overwritten with a new value. This can be an indication that data transfer information has been generated for the corresponding logical address.

Figure 1:
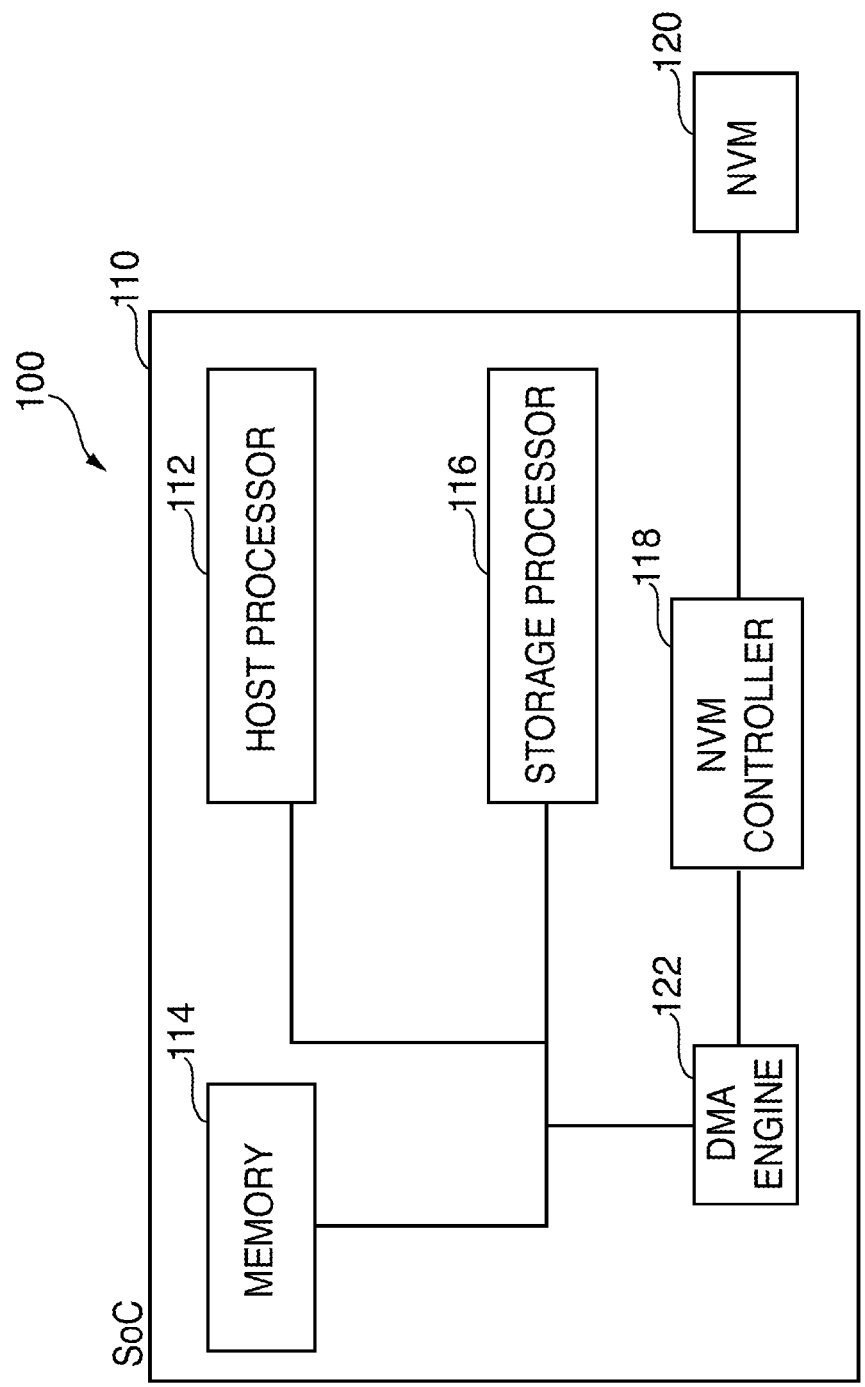
FIG. 1 is a block diagram of an electronic device configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can be the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

System-on-a-chip 110 can include host processor 112, memory 114, storage processor 116, NVM controller 118, and direct memory access ("DMA") engine 122. Host processor 112 can control the general operations and functions of SoC 110 and the other components of SoC 110 or device 100. For example, responsive to user inputs and/or the instructions of a requestor (e.g., an application or an operating system), host processor 112 can issue read or write requests to storage processor 116 to obtain data from or store data in NVM 120.

In some embodiments, host processor 112 can generate data transfer information necessary for a requestor to obtain data read from NVM 120. As used herein, "data transfer information" can include physical buffer location information and decryption information associated with the data. Instead of or in addition to physical buffer location information and decryption information, persons skilled in the art will appreciate that data transfer information can include any other suitable information.

For example, physical buffer location information corresponding to memory 114 may need to be generated because a requestor may operate only in the logical address space. That is, along with an instruction to read data, a requestor can provide one or more logical buffer pointers to host processor 112 indicating where the data should be stored in memory 114. Upon receiving the one or more logical buffer pointers, host processor 112 can iterate through each logical buffer pointer and perform logical-to-physical translations (e.g., translate each logical buffer pointer to a corresponding physical buffer pointer). In some embodiments, the resulting buffer location information (e.g., physical buffer pointers) can be provided to storage processor 116 in the form of DMA scatter/gather lists.

As another example, decryption information may need to be generated because data can be encrypted prior to being stored on NVM 120. In particular, the data can be encrypted using one or more "encryption seeds". In some embodiments, and particularly for Advanced Encryption Standard ("AES") based encryption, the encryption seeds can include an AES key and an initialization vector ("IV"). The AES key can be supplied by host processor 112 or by a system key store (not shown in FIG. 1) on behalf of a requestor (e.g., an application or an operating system). In some embodiments, the system key store can be stored in memory 114.

Consequently, in some cases, each AES key that is generated can be associated with a particular requestor, and may be unique to the requestor. Moreover, in some cases, AES keys can also be unique to each file.

In addition, for each logical block of a file, host processor 112 can also generate an IV, which can be based at least in part on the AES key. In some embodiments, the IV can be a cipher block chaining ("CBC") IV.

The IV can be used to provide additional randomization of data. For example, for some encryption algorithms (e.g., AES-based encryption), if the same AES key is applied to two sets of identical data, the same outputs may be produced. This is because AES behaves deterministically if provided with the same keys and data. As a result, data security can be compromised because it may be easy to identify macro-level patterns within files. In contrast, by applying an IV as an input to the encryption algorithm in addition to an AES key, identical sets of data can be encrypted differently.

In some embodiments, the IV can be generated based on the logical block address ("LBA") where data is located on NVM 120. In other embodiments, the IV can be generated for each logical block of a file. For instance, for a file with size 2 MB, host processor 112 can split the file into 500 logical blocks of size 4 KB. Then, for each logical block, the IV can be generated based on a cryptographic hash of the AES key and an offset into a file corresponding to the logical block (e.g., a logical block number). For instance, for logical block 1 of a file, the offset into the file, which can be one of the inputs of the IV, is logical block 1. In some cases, the IV may also be divided by a pre-determined value (e.g., 4 KB).

Using such an approach, multiple IVs can be generated for a file having multiple logical blocks. In addition, the IV that is generated for each logical block of a file can be independent of the logical block's physical location in NVM 120.

Host processor 112 can include any combination of hardware, software, and firmware, and any components, circuitry, or logic operative to drive the functionality of electronic device 100. For example, host processor 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of host processor 112. Memory 114 can store firmware or software applications that may be executed by host processor 112, storage processor 116, or NVM controller 118, can provide temporary storage for the firmware or software, or a combination thereof.

Memory 114 may be a shared resource that can be accessed by parallel processors (e.g., host processor 112 and storage processor 116). Thus, in some embodiments, a first processor (e.g., host processor 112) can write data to memory 114, and a second processor (e.g., storage processor 116) can later ping memory 114 to examine the data written by the first processor. In some cases, memory 114 can include a first-in, first-out ("FIFO") buffer.

Storage processor 116 may include any suitable combination of hardware, software, and/or firmware. For example, storage processor 116 may share the responsibility of managing and/or accessing the physical memory locations of NVM 120 with an NVM driver on host processor 112. Alternatively, storage processor 116 may perform substantially all of the management and access functions for NVM 120.

Memory management and access functions that may be performed by storage processor 116 can include issuing read, write, or erase commands and performing wear leveling, bad block management, garbage collection, logical-to-physical address mapping, SLC or MLC programming decisions, applying error correction or detection, and data queuing to set up program commands.

In some embodiments, storage processor 116 can be a DMA master that can program DMA engine 122. For example, upon obtaining the DMA scatter/gather lists from host processor 112, storage processor 116 can configure DMA engine 122 to use the DMA scatter/gather lists for saving requested data at buffer locations in memory 114 that can later be accessed by the requestor. Persons skilled in the art will appreciate that DMA engine 122 can be implemented using any suitable hardware and/or software. For example, in serial ATA ("SATA") systems, DMA engine 122 can be an input/output ("I/O") bus.

Because data can be stored in an encrypted form on NVM 120, DMA engine 122 can also be programmed to recover original unencrypted data from the encrypted data read from NVM 120. The encryption seeds used for decryption may be the same as the seeds originally used for encryption. That is, storage processor 116 can transmit an AES key and one or more IVs that are generated by host processor 112 to DMA engine 122. Then, using the AES and the one or more IVs as a filter, DMA engine 122 can decrypt encrypted data read from NVM 120 in order to produce the original saved data (e.g., the plaintext version of a file).

In other embodiments, the DMA master may be an off-chip DRAM controller. Thus, the DRAM controller can program DMA engine 122. In addition, in PCI Express ("PCIe") systems, the DRAM controller can also perform translations and specify buffer locations that a requestor needs to access in memory 114.

In some embodiments, electronic device 100 can include a target device, such as a flash memory drive or SD card, that includes NVM 120. In these embodiments, SoC 110 or host processor 112 may act as the host controller for the target device. For example, as the host controller, SoC 110 can issue read and write requests to the target device.

Figure 2:
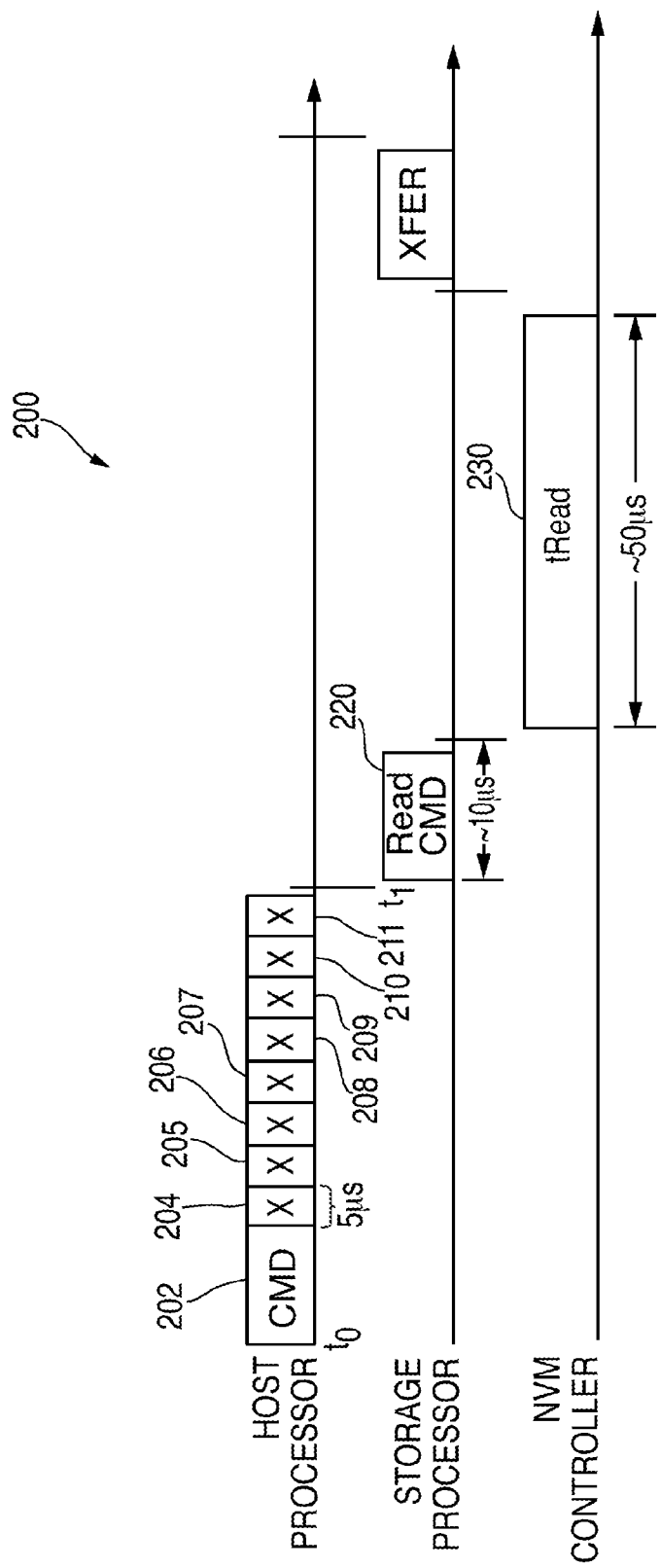
FIG. 2 is a timing diagram for reading data in a conventional system.

Turning now to FIG. 2, a timing diagram 200 for reading data in a conventional system is shown. At $t_0$, host processor (e.g., host processor 112 of FIG. 1) can generate read command 202. Then, before waking up a storage processor (e.g., storage processor 116 of FIG. 1), the host processor can generate data transfer information associated with read command 202. For example, if read command 202 includes 8 pages, where each page has a size of 4k, the host processor can iterate through and generate data transfer information 204-211 for each page.

The buffer location translation of the logical addresses and decryption information lookup can be a computationally intensive process that takes a significant period of time (e.g., 5 μs/LBA). Thus, when the host processor is ready to transmit read command 202 and associated data transfer information 204-211 to the storage processor at $t_1$, a significant amount of time may have already lapsed. In other words, there is a delay in the data read time because the generation of data transfer information 204-211 occurs serially with read command 220, which is issued by the storage processor, and $t_{read}$ 230, which is performed by an NVM controller.

Accordingly, in order to improve overall read latency, data transfer information can be generated by the host processor while the storage processor is processing an initial command. This can reduce the overhead by the amount of time that it takes for the host processor to generate the data transfer information.

Figure 3:
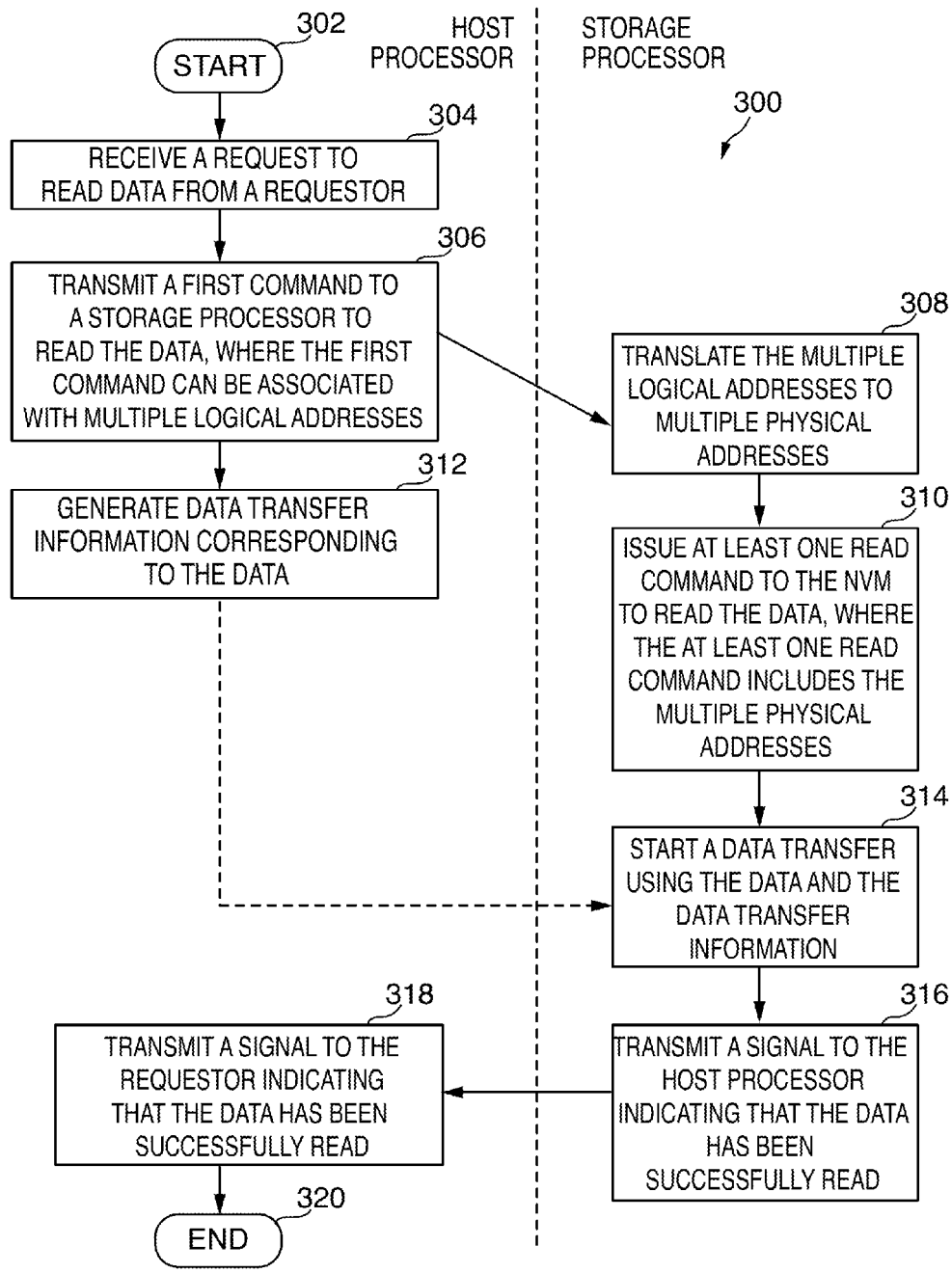
FIG. 3 is a flowchart of an illustrative process for reading data in accordance with various embodiments of the invention.

For example, turning now to FIG. 3, a flowchart of an illustrative process 300 is shown for reading data in accordance with various embodiments of the invention. As shown in FIG. 3, the steps to the left of the vertical dashed line can correspond to steps performed by a host processor (e.g., host processor 112 of FIG. 1), and the steps to the right of the dashed line can correspond to steps performed by a storage processor (e.g., storage processor 116 of FIG. 1).

Process 300 can start at step 302, and at step 304, the host processor can receive a request to read data from a requestor (e.g., an application or an operating system). Then, at step 306, the host processor can transmit a first command to the storage processor to read the data, where the first command can be associated with multiple logical addresses (e.g., LBAs). The multiple logical addresses can be sufficient to enable the reading of data from an NVM.

Figure 4:
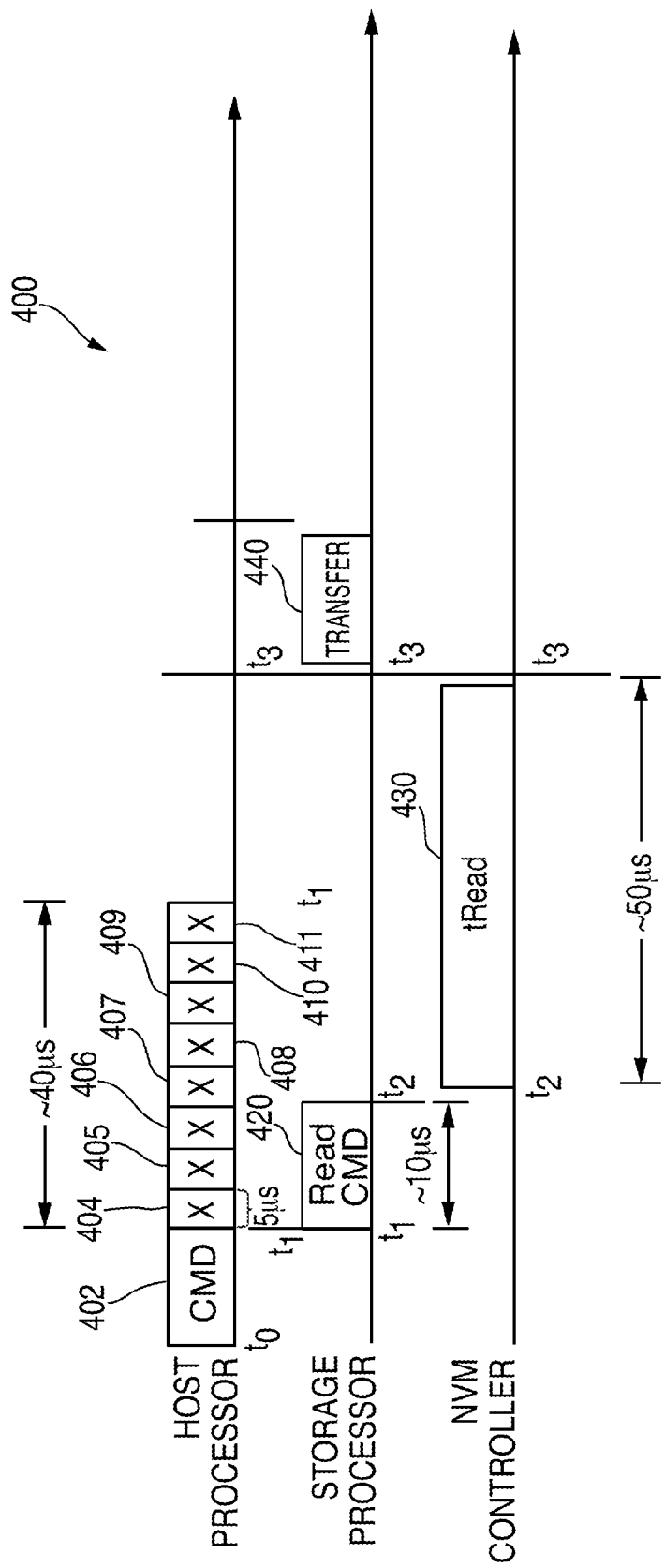
FIG. 4 is a timing diagram for reading data in accordance with various embodiments of the invention.

Referring now to FIG. 4, an illustrative timing diagram 400 for reading data is shown. At $t_0$, first command 402 can be transmitted from the host processor to the storage processor.

The first command can have any suitable command structure. For example, the first command can be a read command that includes the multiple logical addresses and a count. This can be the minimal set of data that is required for the storage processor (e.g., a translation layer of the storage processor or the system) to begin to execute the first command. As another example, the first command can be a read command that includes the multiple logical addresses, a tag value, and a count. The tag value can be a value that uniquely identifies the read command. The count can be set to be the size of the read command. For example, if the read command is associated with reading 32 KB of data, count can be set to 32.

As yet another example, the first command can include a tag value and a pointer to one or more memory locations in volatile memory (e.g., memory 114 of FIG. 1). The one or more memory locations can be used for storing data that can provide context for the first command. For instance, the one or more memory locations can store a command packet corresponding to the tag value. The command packet can include, for instance, the multiple logical addresses and the count. In some cases, the one or more memory locations can also store data transfer information corresponding to the tag value, which may be generated at a later time. Persons skilled in the art will appreciate that in addition to the tag value, the logical addresses, the count, and the data transfer information, the first command can also be associated with any other suitable information such as, for example, one or more characteristics of the data (e.g., priority of the data and/or whether the data is dynamic or static).

In some embodiments, the data transfer information can be stored as arrays in the one or more memory locations. For example, referring now to FIG. 5, volatile memory 500 is shown that can include buffer pointer array 502, IV array 504, and AES key array 506. Volatile memory 500 can be the same as or similar to memory 114 (FIG. 1). The pointer that is included in the first command can thus indicate the memory locations of arrays 502, 504, and 506 in the volatile memory.

Arrays 502, 504, and 506 can have sizes that are associated with the size of data associated with the first command. For example, if data associated with the first command has a size (e.g., count) of ten, buffer pointer array 502, IV array 504, and AES key array 506 can each have ten entries. In addition, each entry of arrays 502, 504, and 506 can correspond to a logical address of the data. For example, the entries of arrays 502, 504, and 506 can correspond to LBA offsets 0-9, respectively.

Referring back to FIG. 3, the transmission of the first command from the host processor to the storage processor at step 306 can be a unidirectional transmission. The receipt of the first command by the storage processor can subsequently cause an interrupt on the storage processor (e.g., wake up the storage processor).

Accordingly, at step 308, the storage processor can translate the multiple logical addresses to multiple physical addresses (e.g., physical block addresses or physical page addresses). For example, the storage processor can determine the physical addresses by performing a logical-to-physical address table lookup. As another example, the storage processor can determine the physical addresses by traversing a logical-to-physical address map. The storage processor can also perform one or more additional tasks such as, for example, updating read disturb counters.

Then, at step 310, the storage processor can issue at least one read command to the NVM (e.g., to an NVM controller such as NVM controller 118 of FIG. 1) to read the data, where the at least one read command includes the multiple physical addresses. In some cases, the at least one read command can include the size (e.g., count) of the first command.

For example, referring again to FIG. 4, the storage processor can receive first command 402 from the host processor at $t_1$, and at $t_2$, the storage processor can distribute read command 420 to one or more NVM dies. In some cases, the time for translating the logical addresses and for issuing read command 420 can be approximately 10 µs.

Referring back to FIG. 3, after issuing the at least one read command, the storage processor can wait for the NVM to read the data. For example, as shown in FIG. 4, upon receiving read command 420 at $t_2$, an NVM controller (e.g., NVM controller 118 of FIG. 1) can start one or more NVM dies of an NVM (e.g., NVM 120 of FIG. 1) in order to read the data (e.g., start $t_{read}$ 430 on the one or more NVM dies). Typically, $t_{read}$ 430 can take approximately 50 µs.

Referring again to FIG. 3, after transmitting the first command at step 306, at step 312, the host processor can generate data transfer information corresponding to the data. This can occur while the data is being read from the NVM. Accordingly, the generation of the data transfer information can overlap with the ongoing $t_{read}$.

For example, as shown in FIG. 4, after transmitting first command 402 at $t_1$, the host processor can generate data transfer information for each logical sector (e.g., each logical block address) of the data. Thus, if command 402 includes 8 pages, where each page has a size of 4k, the host processor can generate data transfer information 404-411 for all 8 pages. The generation of data transfer information 404-411 can scale linearly with the number of logical sectors. Thus, for ten sectors of data, the host processor may need to perform ten iterations of generating the data transfer information.

It may take the host processor a period of time (e.g., approximately 5 µs) to generate the data transfer information for each LBA. Thus, by dispatching first command 402 to the storage processor at $t_0$, the generation of data transfer information 404-411 can occur concurrently with (or at least partially overlap) the processing of read command 420 and $t_{read}$ 430. For instance, as shown in FIG. 4, there is an overlap of approximately 40 µs.

Figure 5:
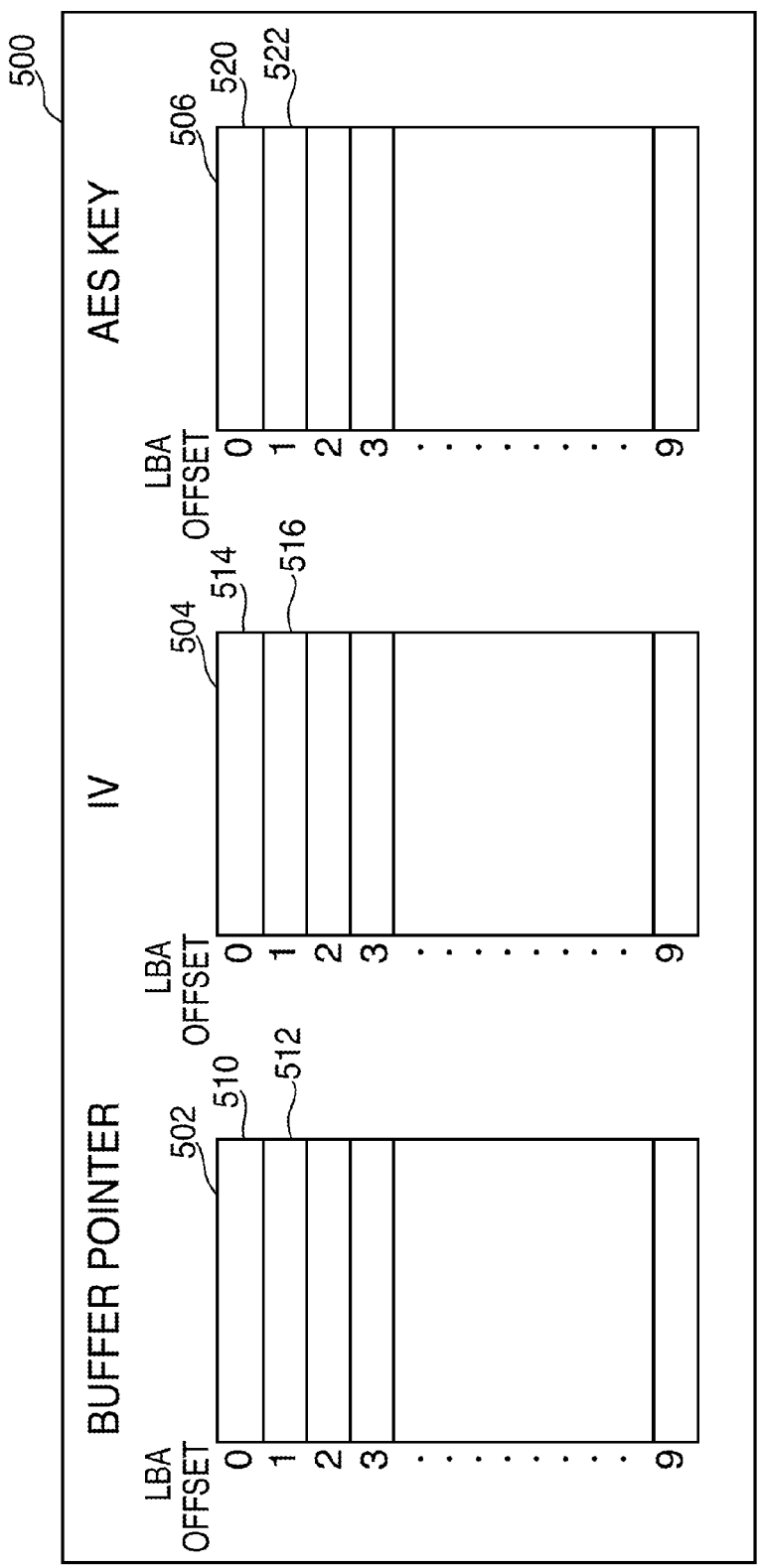
FIG. 5 is a graphical representation of arrays stored in volatile memory in accordance with various embodiments of the invention.

The data transfer information that is generated can include any information that provides suitable context for the first command. For instance, as discussed above, the host processor can receive logical buffer pointers from the requestor, which can indicate where the data should be stored in the volatile memory. The host processor can then translate the logical buffer pointers to corresponding physical buffer pointers. In particular, for each logical buffer pointer, the host processor can obtain a corresponding physical buffer location. The physical buffer location can then be stored in a corresponding entry of a buffer pointer array. For example, as shown in FIG. 5, the physical buffer location corresponding to the first LBA can be stored in entry 510 of buffer pointer array 502. Likewise, the physical buffer corresponding to the second LBA can be stored in entry 512 of buffer pointer array 502, and so on. Thus, in some embodiments, buffer pointer array 502 can include DMA scatter/gather lists.

In addition, because the data read from the NVM may be encrypted, the host processor can generate decryption information (e.g., one or more AES keys and/or initialization vectors). The decryption information can then be saved in one or more memory locations of volatile memory (e.g., memory 114 of FIG. 1). For example, as shown in FIG. 5, the initialization vector corresponding to the first LBA can be stored in entry 514 of IV array 504 and the AES key corresponding to the first LBA can be stored in entry 520 of AES key array 506. Likewise, the initialization vector corresponding to the second LBA can be stored in entry 516 of IV array 504 and the AES key corresponding to the second LBA can be stored in entry 522 of AES key array 506, and so on.

Consequently, each entry of arrays 502, 504, and 506 can be populated with decryption information and/or buffer location information.

Referring back to FIG. 3, after issuing the at least one read command at step 310, the storage processor can determine when the data read from the NVM can be synchronized with associated data transfer information. This synchronization can occur when both data transfer information and the data read from the NVM become available.

Once the storage processor has received both the data transfer information and the data read from the NVM, at step 314, the storage processor can start a data transfer using the data and the data transfer information.

In particular, the storage processor can initiate a DMA request for the data, where the DMA request can include the data transfer information. In some cases, the storage processor can configure and program a DMA engine (e.g., DMA engine 122 of FIG. 1) to start the data transfer using the data transfer information.

The time at which data transfer begins may depend on when the host processor has finished generating the data transfer information and when $t_{read}$ has completed. For example, given the timing requirements indicated in FIG. 4, if a first command includes twelve LBAs or fewer, data transfer information may be generated for all LBAs before $t_{read}$ completes. Thus, in the example shown in FIG. 4, because first command 402 has fewer than twelve LBAs, data transfer 440 can begin as soon as $t_{read}$ 430 has completed. If, however, a first command includes more than twelve LBAs, the storage processor may need to wait for the host processor to continue generating data transfer information for at least a portion of the LBAs after $t_{read}$ is complete.

After the data transfer has completed, process 300 may move to step 316, where the storage processor can transmit a signal to the host processor indicating that the data has been successfully read. For example, the signal can include the tag value corresponding to the first command. Upon receiving this signal, at step 318, the host processor can transmit a signal to the requestor indicating that the data has been successfully read. Process 300 may end at step 320.

Figure 6:
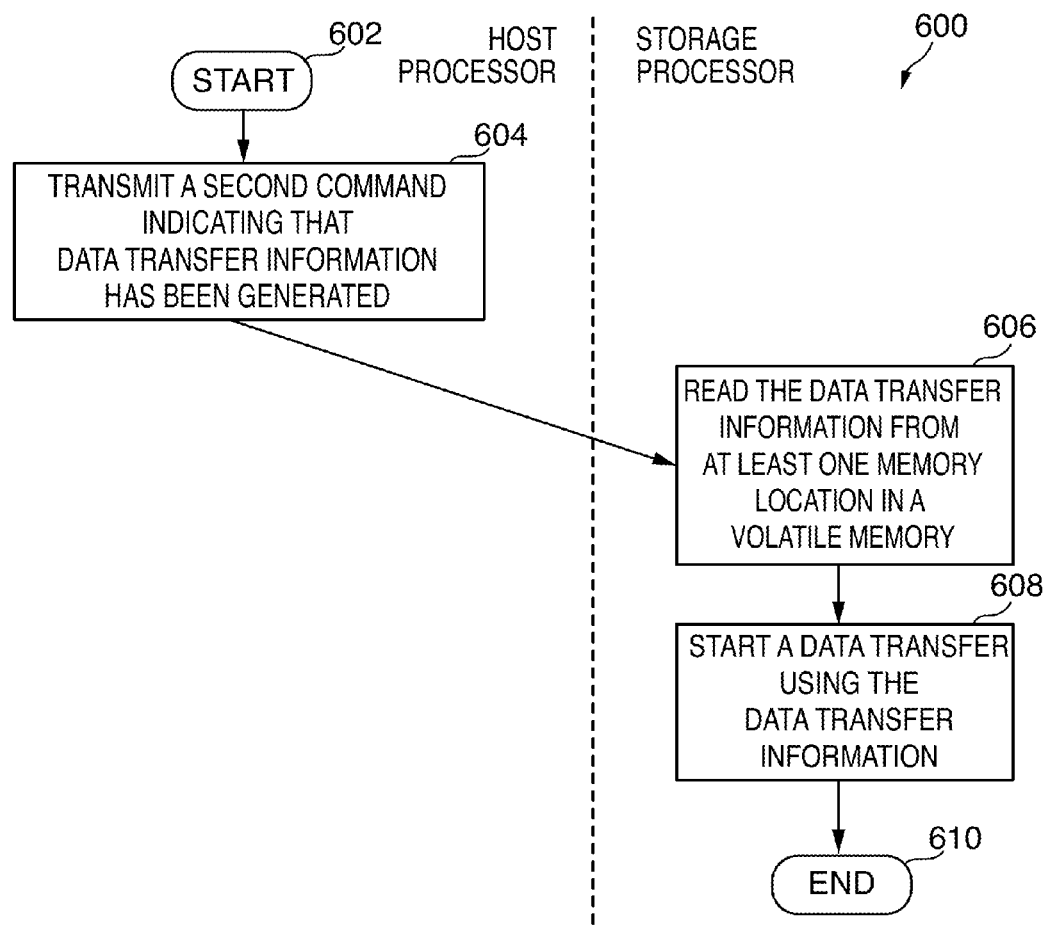
FIG. 6 is a flowchart of an illustrative process for determining whether data transfer information has been generated in accordance with various embodiments of the invention.
Figure 7:
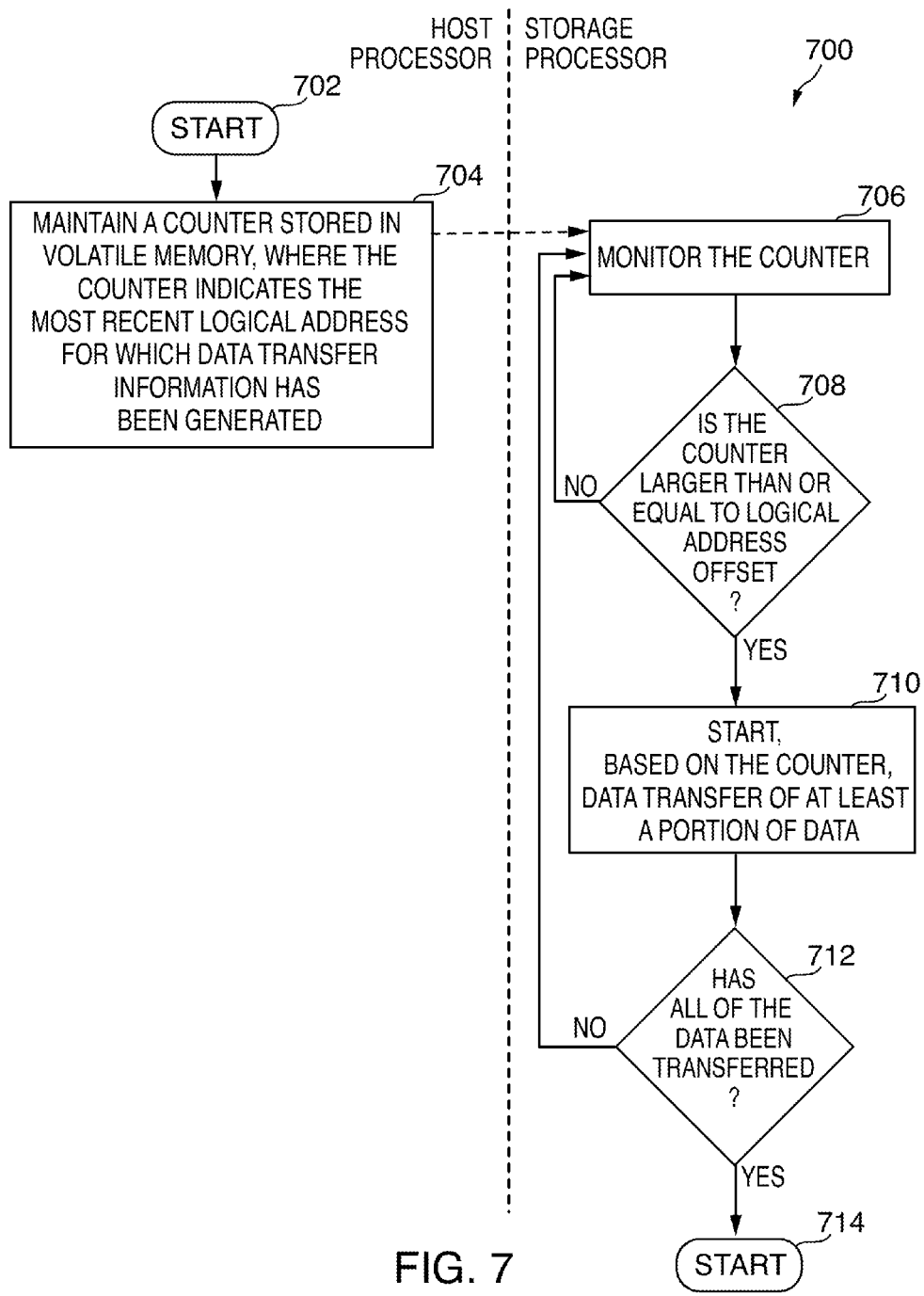
FIG. 7 is a flowchart of another illustrative process for determining whether data transfer information has been generated in accordance with various embodiments of the invention.

Because there can be several approaches for determining when data transfer information has been generated, the process flow from step 312 to step 314 of process 300 of FIG. 3 is shown as a dashed arrow. The various approaches are discussed in more detail in connection with FIGS. 6-8. As in FIG. 3, the steps to the left of the vertical dashed line of FIGS. 6-8 can correspond to steps performed by a host processor (e.g., host processor 112 of FIG. 1), and the steps to the right of the dashed line can correspond to steps performed by a storage processor (e.g., storage processor 116 of FIG. 1).

In some embodiments, the host processor can send a second command to the storage processor when data transfer information has been generated for all logical addresses associated with the first command. This can indicate that decryption information and physical buffer location information for all logical addresses associated with the first command are valid. For example, turning now to FIG. 6, a flowchart of an illustrative process 600 for determining whether data transfer information has been generated is shown. Process 600 may begin after step 312 of process 300 (FIG. 3) has been performed by the host processor (e.g., the host processor has generated data transfer information corresponding to the data).

Process 600 may start at step 602, and, at step 604, the host processor can transmit a second command (e.g., a completion interrupt) to the storage processor indicating that data transfer information has been generated. In some cases, the second command can include a tag value that matches an associated first command.

Upon receiving the second command, at step 606, the storage processor can read the data transfer information from at least one memory location in a volatile memory (e.g., memory 114 of FIG. 1). For example, the storage processor can read the data transfer information from arrays 502-506 of FIG. 5. Then, at step 608, the storage processor can start data transfer using the data transfer information (e.g., initiate a DMA request for data read from the NVM). This step can be similar to or the same as step 314 of process 300 (FIG. 3). Process 600 can end at step 610.

Accordingly, process 600 can be a discrete process such that the second command is transmitted only after data transfer information for all logical addresses has been generated by the host processor. Although this tends to be a reliable process, the data transfer may stall while the system waits for the host processor to finish processing all logical addresses. This is because the host processor can operate in a fully preemptive multi-tasking state, where it can begin to process another task before it has finished generating data transfer information for all logical addresses.

In addition, the storage processor may not start any data transfer until it receives the second command. In particular, if $t_{read}$ completes before the data transfer information has been generated, the storage processor may need to wait an additional amount of time for the second command.

Accordingly, in other embodiments, the system can use a counter to determine whether data transfer information has been generated for at least a portion of the data. For example, turning now to FIG. 7, a flowchart of illustrative process 700 is shown for determining whether data transfer information has been generated. Process 700 may begin while the host processor is performing step 312 of process 300 (FIG. 3), where the host processor is generating data transfer information.

Process 700 may start at step 702, and at step 704, the host processor can maintain a counter stored in volatile memory (e.g., memory 114 of FIG. 1), where the counter indicates the most recent logical address (e.g., sector) for which data transfer information has been generated. In some embodiments, the counter can be set to a value corresponding to the logical address offset of the most recent logical address. For example, the counter can have an initial value of zero. Then, for each subsequent logical address for which data transfer information has been generated, the counter can be incremented by one. As discussed above, it may take approximately 5 μs to generate data transfer information for each logical address. Hence, the counter may be incremented approximately every 5 μs.

At step 706, the storage processor can monitor the counter. In other words, the counter can be shared by the host processor and the storage processor. The flow of process 700 from step 704 to step 706 is shown as a dashed line to indicate that both steps can occur concurrently. That is, the storage processor can monitor the hardware coherent counter (e.g., continuously or at pre-determined intervals) while the counter is being maintained and updated by the host processor.

At step 708, the storage processor can determine whether the counter is larger than or equal to a logical address offset. For example, the storage processor may have received data corresponding to a logical address that has been read from the NVM. Based on the logical address, the storage processor can calculate a logical address offset and determine whether the counter is larger than or equal to the calculated logical address offset.

If, at step 708, the counter is smaller than the calculated logical address offset, the storage processor may determine that the host processor has not yet generated data transfer information for the logical address. Consequently, process 700 may return to step 706, where the storage processor can continue to monitor the counter and wait for the data transfer information to be generated.

If, at step 708, the counter is larger than or equal to the calculated logical address offset, the storage processor may determine that the host processor has generated data transfer information for the logical address.

Continuing to step 710, the storage processor can start, based on the counter, data transfer of at least a portion of data (e.g., initiate a DMA request for at least a portion of data). In particular, the storage processor can start data transfer of the data corresponding to the logical address. In addition, the storage processor may determine if there are additional data read from the NVM corresponding to logical address offsets that are smaller than the counter that also have not been transferred. In other words, the storage processor may not have had an opportunity to perform the comparison in step 708 upon receiving the additional data. Consequently, the storage processor can start data transfer of the additional data.

Then, at step 712, the storage processor can determine whether all of the data has been transferred. If, at step 712, the storage processor determines that all of the data has been transferred, process 700 may end at step 714. If, at step 712, the storage processor instead determines that all of the data has not been transferred, process 700 may return to step 706, where the storage processor can continue to monitor the counter.

Although there is less delay associated with the data transfer using this iterative approach, there can be a resource cost because a counter needs to be maintained by the system. Thus, in further embodiments, the system can employ a cache efficient approach, where the host processor can first write a default token value to each entry of an array (e.g., buffer pointer array such as buffer pointer array 502 of FIG. 5, an IV array such as IV array 504 of FIG. 5, and an AES key array such as AES key array 506 of FIG. 5). The storage processor can then monitor the array and detect when a default token value has been overwritten with a new value. This can be an indication that data transfer information has been generated for the corresponding logical address.

Figure 8:
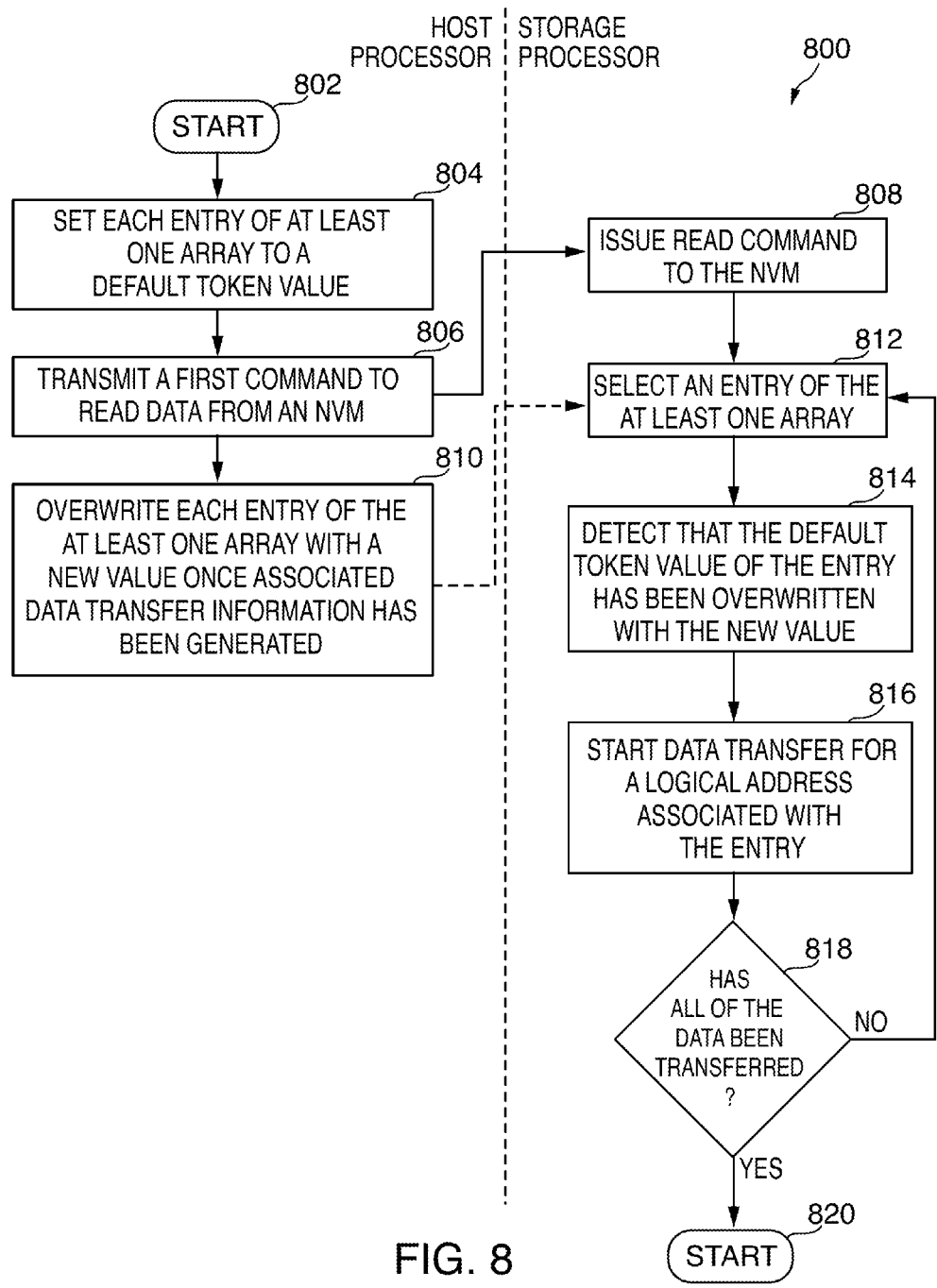
FIG. 8 is a flowchart of a further illustrative process for determining whether data transfer information has been generated in accordance with various embodiments of the invention.

For example, turning now to FIG. 8, a flowchart of illustrative process 800 is shown for determining whether data transfer information has been generated. Process 800 may begin after step 304 of process 300 (FIG. 3), where the host processor may have received a request to read data from a requestor.

Process 800 may start at step 802, and at step 804, the host processor can set (e.g., flush) each entry of one or more arrays (e.g., buffer pointer array 502 of FIG. 5, IV array 504 of FIG. 5, and/or AES key array 506 of FIG. 5) to a default token value. The default token value can be any suitable value. For example, the default token value can be set to a value that does not correspond to a real array value such as, for instance, a value that is larger than the size of volatile memory (e.g., memory 114 of FIG. 1). This value cannot correspond to an actual physical buffer location of a buffer pointer array. As another example, the default token value can be set to a value that both the host processor and the storage processor recognize as the token value.

Then, process 800 may move to step 806, where the host processor can transmit a first command to read data from an NVM (e.g., NVM 120 of FIG. 1). This step can be the same as or similar to step 306 of process 300 (FIG. 3).

Continuing to step 808, the storage processor can issue a read command to the NVM. This step can correspond to steps 308 and/or 310 of process 300 (FIG. 3).

After transmitting the first command, at step 810, the host processor can overwrite each entry of the one or more arrays with a new value once associated data transfer information has been generated. For example, the new value can correspond to a physical buffer location for a buffer pointer array, an IV for an IV array, and an AES key for an AES key array. In other words, the host processor can iterate through each logical address and generate data transfer information for the logical address. Once the data transfer information has been generated for a particular logical address, the host processor can populate an entry of the at least one array with the data transfer information.

Concurrently with step 810, at step 812, the storage processor can select an entry of the one or more arrays. At step 814, the storage processor can detect that the default token value of the entry has been overwritten with the new value.

Continuing to step 816, the storage processor can start data transfer (e.g., initiate a DMA request) for a logical address associated with the entry. For example, upon determining that a physical buffer location, an IV, and an AES key have all been generated for a particular logical address, the storage processor can start data transfer for the logical address using the physical buffer location, the IV, and the AES key. Hence, instead of waiting until the host processor has finished generating data transfer information for all logical addresses, the storage processor can start data transfer for a portion of data as soon as corresponding data transfer information has been generated.

Then, at step 818, the storage processor can determine whether all of the data has been transferred. If, at step 818, the storage processor determines that all of the data has been transferred, process 800 may end at step 820. Otherwise, process 800 may return to step 812, where the storage processor can select another entry of the one or more arrays.

In comparison to a discrete process (e.g., process 600 of FIG. 6), using this approach, the storage processor can start data transfer of at least a subset of logical addresses even if the host processor is interrupted while generating data transfer information. In addition, because there are no additional counters that are being maintained by the host processor, no additional resource costs are associated with this approach.

However, because a processor cache (e.g., memory 114 of FIG. 1) needs to remain in a coherent state, this approach may be less reliable as compared to the other approaches. Cache incoherency can occur if, for example, the host processor generates the information in a particular order, but a memory controller (e.g., a DRAM controller) writes the information to the cache in a different order. Thus, although the storage processor may detect a new value in an entry and assume that all previous entries have also been updated, this assumption may not be accurate in all situations.

In some embodiments, a similar parallelism between command setup and command execution can be applied to write commands. That is, a first write command can be issued from a host processor to a storage processor, where the first write command can include sufficient information for data to be programmed to an NVM. Meanwhile, the host processor can execute garbage collection ("GC") logic while the data is being written.

It should be understood that processes 300, 600, 700, and 800 of FIGS. 3 and 6-8, respectively, are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for generating multiple read commands, the method comprising:
   receiving a request to read data, wherein the data is associated with a plurality of logical addresses;
   splitting the received read request into two parts: read information and data transfer information, wherein both parts are required for read data to be transmitted over a bus from a non-volatile memory;
   transmitting the read information as part of a first command to a storage processor to read the data from the non-volatile memory, wherein the first command comprises the plurality of logical addresses, a tag value, and a count;
   generating the data transfer information corresponding to the data while the data is being read from the non-volatile memory, wherein the first command is transmitted to the storage processor prior to generation of the data transfer information;
   transmitting a second command to the storage processor indicating that the data transfer information has been generated; and
   initiating transfer of the read data from the non-volatile memory after the data has been read and the second command has been transmitted.

2. The method of claim 1, wherein the data is stored in an encrypted form in the non-volatile memory.

3. The method of claim 2, wherein the data transfer information comprises decryption information and physical buffer location information.

4. The method of claim 3, wherein the decryption information comprises at least one Advanced Encryption Standard ("AES") key and at least one initialization vector ("IV").

5. The method of claim 3, wherein the second command indicates that the decryption information and the physical buffer location information are valid.

6. The method of claim 1, further comprising transmitting at least one signal indicating that the data has been successfully read.

7. The method of claim 1, wherein the first command comprises a tag value and a pointer to at least one memory location in volatile memory.

8. The method of claim 7, wherein the at least one memory location in the volatile memory is used to store at least one of the plurality of logical addresses, a count, and the data transfer information.

9. A system comprising:
non-volatile memory ("NVM"); and
a system-on-a-chip ("SoC") comprising:
a host processor; and
a storage processor coupled to the host processor, wherein the storage processor is operative to:
receive a first command to read data from the NVM from the host processor, wherein the received first command is associated with two parts including read information and data transfer information, wherein both parts are required for read data to be transmitted over a bus from the NVM, wherein the read information is associated with a plurality of logical addresses, wherein the data is associated with the plurality of logical addresses, and, wherein the first command comprises a tag value and a pointer to at least one memory location in volatile memory;
translate the plurality of logical addresses to a plurality of physical addresses;
issue at least one read command to the NVM to read the data, wherein the at least one read command comprises the plurality of physical addresses;
receive data transfer information associated with the data from the host processor and the data read from the NVM, wherein the read command is received prior to receipt of the data transfer information so that the at least read command is executed concurrently with the receipt of the data transfer information; and
initiate a direct memory access ("DMA") request for the data after the at least one read command is executed and the data transfer information is received, wherein the DMA request comprises the data transfer information.

10. The system of claim 9, wherein the storage processor is operative to transmit a signal to the host processor indicating that the data has been successfully read.

11. The system of claim 9, wherein the SoC comprises volatile memory, and the storage processor is operative to:
receive a second command from the host processor indicating that the data transfer information has been generated; and
read the data transfer information from at least one memory location in the volatile memory.

12. The system of claim 9, wherein the SoC comprises volatile memory, and the host processor is operative to maintain a counter stored in the volatile memory, wherein the counter indicates the most recent logical address for which the data transfer information has been generated.

13. The system of claim 12, wherein the storage processor is operative to initiate, based on the counter, the DMA request for at least a portion of the data.

14. The system of claim 9, wherein the SoC comprises volatile memory for storing the data transfer information in a plurality of arrays, wherein each array of the plurality of arrays comprise a plurality of entries each corresponding to a logical address of the plurality of logical addresses.

15. The system of claim 14, wherein the host processor is operative to set each entry of the plurality of entries to a default token value.

16. The system of claim 15, wherein the storage processor is operative to:
detect that the default token value of an entry of the plurality of entries has been overwritten with a new value; and
initiate the DMA request for a logical address associated with the entry.

* * * * *